(12) United States Patent
Tsubaki (10) Patent No.: US 12,469,119 B2
(45) Date of Patent: Nov. 11, 2025

(54) MACHINE LEARNING SYSTEM, LEARNING DATA COLLECTION METHOD AND STORAGE MEDIUM

(71) Applicant: TOYOTA JIDOSHA KABUSHIKI KAISHA, Toyota (JP)

(72) Inventor: Yuta Tsubaki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 651 days.

(21) Appl. No.: 17/872,594

(22) Filed: Jul. 25, 2022

(65) Prior Publication Data

US 2023/0096532 A1 Mar. 30, 2023

(30) Foreign Application Priority Data

Sep. 24, 2021 (JP) .................. 2021-155888

(51) Int. Cl.
*G06K 9/00* (2022.01)
*G06F 18/28* (2023.01)
(Continued)

(52) U.S. Cl.
CPC ............ *G06T 7/0004* (2013.01); *G06F 18/28* (2023.01); *G06N 20/00* (2019.01); *G06T 1/0007* (2013.01);
(Continued)

(58) Field of Classification Search
CPC ....... G06T 1/0007; G06T 7/00; G06T 7/0002; G06T 7/0004; G06T 7/0006; G06T 7/0008; G06T 7/001; G06T 7/70; G06T 7/97; G06T 2207/20081; G06T 2207/20084; G06T 2207/30108; G06T 2207/30164; G06T 2207/30168; G06V 10/10; G06V 10/12;
(Continued)

(56) References Cited

U.S. PATENT DOCUMENTS 12,367,659 B2 * 7/2025 Konno ............... G06V 10/267
2021/0233232 A1 7/2021 Sugasawa et al.
(Continued)

FOREIGN PATENT DOCUMENTS

JP 2011149717 A * 8/2011
JP 2021076472 A * 5/2021
(Continued)

*Primary Examiner* — Eric Rush
(74) *Attorney, Agent, or Firm* — Sughrue Mion, PLLC (57) ABSTRACT

A machine learning system in the present disclosure includes: an image pickup unit that photographs a product and acquires a product image; a preprocessing unit that generates an inspection target site image by clipping an image of an inspection target site of the product based on a setting file, and saves the generated inspection target site image in an image saving unit; and an inspection processing unit that performs a quality determination process on the inspection target site image of a quality determination object indicated as a quality determination target by production instruction information, in which when the inspection target site image saved in the image saving unit is relevant to a product that is designated by the production instruction information as a learning object that is not the quality determination target, the inspection target site image is accumulated in the image saving unit, as learning data.

8 Claims, 4 Drawing Sheets

(51) Int. Cl.
    *G06N 20/00*    (2019.01)
    *G06T 1/00*     (2006.01)
    *G06T 7/00*     (2017.01)
    *G06V 10/22*    (2022.01)
    *G06V 10/26*    (2022.01)
    *G06V 10/70*    (2022.01)
    *G06V 10/772*   (2022.01)
    *G06V 10/774*   (2022.01)

(52) U.S. Cl.
    CPC .............. *G06V 10/22* (2022.01); *G06V 10/26* (2022.01); *G06V 10/70* (2022.01); *G06V 10/772* (2022.01); *G06V 10/774* (2022.01); *G06T 2207/20081* (2013.01); *G06T 2207/30108* (2013.01); *G06T 2207/30164* (2013.01)

(58) Field of Classification Search
    CPC ........ G06V 10/20; G06V 10/22; G06V 10/25; G06V 10/26; G06V 10/70; G06V 10/72; G06V 10/75; G06V 10/772; G06V 10/774; G06V 10/776; G06V 10/778; G06V 10/7784; G06V 10/7788; G06V 10/7792; G06V 10/7796; G06V 10/82; G06V 10/94; G06V 10/945; G06V 10/96; G06V 2201/06; G06N 3/08; G06N 3/09; G06N 20/00; G06F 18/00; G06F 18/10; G06F 18/15; G06F 18/21; G06F 18/214; G06F 18/2155; G06F 18/217; G06F 18/2178; G06F 18/2185; G06F 18/2193; G06F 18/28; G06F 18/40; G06F 18/41
    USPC ....... 382/100, 103, 141–145, 149, 152, 153, 382/155–157, 159, 160, 224, 226, 228, 382/229, 282, 283, 291, 305–307, 309, 382/312, 325; 348/61, 86, 92, 94, 95, 348/125–130, 135, 143, 148, 161; 700/28–31, 90, 95, 97, 98, 108–110, 117; 702/1, 81–85; 706/11, 12, 14–16, 20, 25, 706/45, 62
    See application file for complete search history.

(56) References Cited

U.S. PATENT DOCUMENTS

| | | | |
|---|---|---|---|
| 2021/0264210 A1* | 8/2021 | Ueta | G06V 10/945 |
| 2022/0129675 A1* | 4/2022 | Takimoto | G06V 10/25 |
| 2023/0011901 A1* | 1/2023 | Palme | G06N 3/084 |
| 2023/0353872 A1* | 11/2023 | Tsujimura | G06V 10/774 |

FOREIGN PATENT DOCUMENTS

| | | |
|---|---|---|
| WO | 2019/230356 A1 | 12/2019 |
| WO | 2021/142475 A1 | 7/2021 |

\* cited by examiner

EXAMPLE OF PRODUCTION INSTRUCTION INFORMATION ABOUT VEHICLE TYPE E1

| VEHICLE TYPE INFORMATION | | PRODUCT SPECIFICATION | | | | | | | |
|---|---|---|---|---|---|---|---|---|---|
| VEHICLE TYPE | PAINT COLOR | EMBLEM | SIDE GRILL | PLATE | CLEARANCE SONAR | ... | HARNESS | LABEL | SENSOR |
| E1 | WHITE | GASOLINE | PRESENT | SILVER | ABSENT | ... | PRESENT | A | COLD DISTRICT |
| INSPECTION INSTRUCTION FLAG → | | INSPECTION | INSPECTION | INSPECTION | INSPECTION | ... | UNLEARNED | UNLEARNED | UNLEARNED |

FIG. 3

EXAMPLE OF SETTING FILE FOR VEHICLE TYPE E1

| COMPONENT NAME | TRIMMING COORDINATES | | LEARNING MODEL SAVING PATH | IMAGE SAVING PATH |
|---|---|---|---|---|
| | UPPER LEFT (x, y) | LOWER RIGHT (x, y) | | |
| EMBLEM | (100, 60) | (140, 80) | C:¥LM¥E1¥emblem.model | C:¥img¥E1¥emblem |
| SIDE GRILL | (200, 140) | (260, 200) | C:¥LM¥E1¥sideg.model | C:¥img¥E1¥sideg |
| PLATE | (200, 210) | (260, 230) | C:¥LM¥E1¥mekki.model | C:¥img¥E1¥mekki |
| CLEARANCE SONAR | (250, 130) | (260, 140) | C:¥LM¥E1¥cleson.model | C:¥img¥E1¥cleson |
| ⋮ | ⋮ | ⋮ | ⋮ | ⋮ |

MACHINE LEARNING SYSTEM, LEARNING DATA COLLECTION METHOD AND STORAGE MEDIUM

CROSS-REFERENCE TO RELATED APPLICATION

This application claims priority to Japanese Patent Application No. 2021-155888 filed on Sep. 24, 2021, incorporated herein by reference in its entirety.

BACKGROUND

1. Technical Field

The present disclosure relates to a machine learning system, a learning data collection method and a storage medium. For example, the present disclosure relates to a machine learning system, a learning data collection method and a storage medium that generate a learning model to be used by artificial intelligence that performs shape recognition of an inspection object using an image resulting from photographing the inspection object.

2. Description of Related Art

On a production line for an automobile, an inspection using an image is sometimes performed in an inspection step of inspecting whether an attached product has been attached in accordance with a specification. For such an inspection, in recent years, there has been proposed a technology of determining the quality of an inspection object from an image containing the inspection object using artificial intelligence. An example of the recognition and the inspection technology is disclosed in International Patent Publication No. 2019/230356.

A learning device described in International Patent Publication No. 2019/230356 includes a camera that acquires image data by picking up a sample of a product, a physical property information acquisition unit that acquires physical property information about the sample, and a computation unit that generates a learning model. The computation unit is configured to identify the category of the sample based on rule information that associates the physical property information and the category, to generate teaching data by associating the identified category and the image data, and to generate the learning model by a machine learning using the teaching data. The learning model receives the image data about the sample, and outputs the category of the sample.

SUMMARY

However, in the technology described in International Patent Publication No. 2019/230356, it is necessary to provide a sensor separately from a camera that merely acquires the image for obtaining the physical property information. Therefore, the system becomes complicated or costs are increased, and further general versatility is lost.

The present disclosure has been made for solving this problem, and has an object to simplify the system configuration.

An aspect of a machine learning system according to the present disclosure includes: an image pickup unit configured to photograph a product and to acquire a product image; a preprocessing unit configured to generate an inspection target site image by clipping an image of an inspection target site of the product based on a setting file that indicates a position and range of the inspection target site on the product image, and to save the generated inspection target site image in an image saving unit; and an inspection processing unit configured to perform a quality determination process on the inspection target site image of a quality determination object, the quality determination process being a process to which artificial intelligence is applied, the quality determination object being indicated as a quality determination target by production instruction information in which a specification of the product is described, in which when the inspection target site image saved in the image saving unit is relevant to a product that is designated by the production instruction information as a learning object that is not the quality determination target, the inspection target site image is accumulated in the image saving unit, as learning data for a learning model that is applied to the artificial intelligence.

An aspect of a learning data collection method according to the present disclosure is a method for collecting learning data using an inspection device that performs a quality determination process of a product on a production line, the learning data being used for creation of a learning model that is applied to artificial intelligence, the method including: an image pickup process of photographing the product that is conveyed on the production line, and acquiring a product image; a preprocess of generating an inspection target site image by clipping an image of an inspection target site of the product based on a setting file that indicates a position and range of the inspection target site on the product image, and saving the generated inspection target site image in an image saving unit; and an inspection process of performing the quality determination process on the inspection target site image of a quality determination object, the quality determination process being a process to which the artificial intelligence is applied, the quality determination object being indicated as a quality determination target by production instruction information in which a specification of the product is described, in which when the inspection target site image saved in the image saving unit is relevant to a product that is designated by the production instruction information as a learning object that is not the quality determination target, the inspection target site image is accumulated in the image saving unit, as learning data for the learning model.

An aspect of a learning data collection program stored in a storage medium according to the present disclosure is a learning data collection program that collects learning data using an inspection device that performs a quality determination process of a product on a production line, the learning data collection program being executed by a computation unit provided in the inspection device, the learning data being used for creation of a learning model that is applied to artificial intelligence, the learning data collection program including: an image pickup process of photographing the product that is conveyed on the production line, and acquiring a product image; a preprocess of generating an inspection target site image by clipping an image of an inspection target site of the product based on a setting file that indicates a position and range of the inspection target site on the product image, and saving the generated inspection target site image in an image saving unit; and an inspection process of performing the quality determination process on the inspection target site image of a quality determination object, the quality determination process being a process to which the artificial intelligence is applied, the quality determination object being indicated as a quality determination target by production instruction information in which a specification of the product is described, in which when the inspection target site image saved in the image saving unit is relevant to a product that is designated by the production instruction information as a learning object that is not the quality determination target, the inspection target site image is accumulated in the image saving unit, as learning data for the learning model.

In the machine learning system, the learning data collection method and the storage medium according to the present disclosure, the learning data that is used for the generation of the learning model is collected in the system that performs the inspection process.

With the present disclosure, it is possible to simplify the system configuration in the machine learning system, the learning data collection method and the storage medium according to the present disclosure.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

For a clear explanation, in the following description and the drawings, omission and simplification are performed when appropriate. Further, elements that are described in the drawings as functional blocks that perform various processes can be constituted by a central processing unit (CPU), a memory and other circuits, as hardware, and are realized by programs loaded on a memory and the like, as software. Accordingly, a person skilled in the art understands that the functional blocks can be realized as various forms by only hardware, only software or a combination of the hardware and software, and forms of the functional blocks are not limited. In the drawings, identical elements are denoted by identical reference characters, and repetitive explanations are omitted as necessary.

Further, the above-described program includes commands (or software codes) for causing a computer to execute one or more functions explained in embodiments when the program is read by the computer. The program may be stored in a non-transitory computer-readable medium or a tangible storage medium. Without being limited, examples of the computer-readable medium or the tangible storage medium includes a memory technology such as a random-access memory (RAM), a read-only memory (ROM), a flash memory or a solid-state drive (SSD), an optical disk storage such as a CD-ROM, a digital versatile disc (DVD), a Blu-ray® disk, and a magnetic storage device such as a magnetic cassette, a magnetic tape or a magnetic disk storage. The program may be sent as a transitory computer-readable medium or a communication medium. Without being limited, examples of the transitory computer-readable medium or the communication medium include a propagation signal such as an electric signal, an optical signal or an acoustic signal.

Embodiment 1

Figure 1:
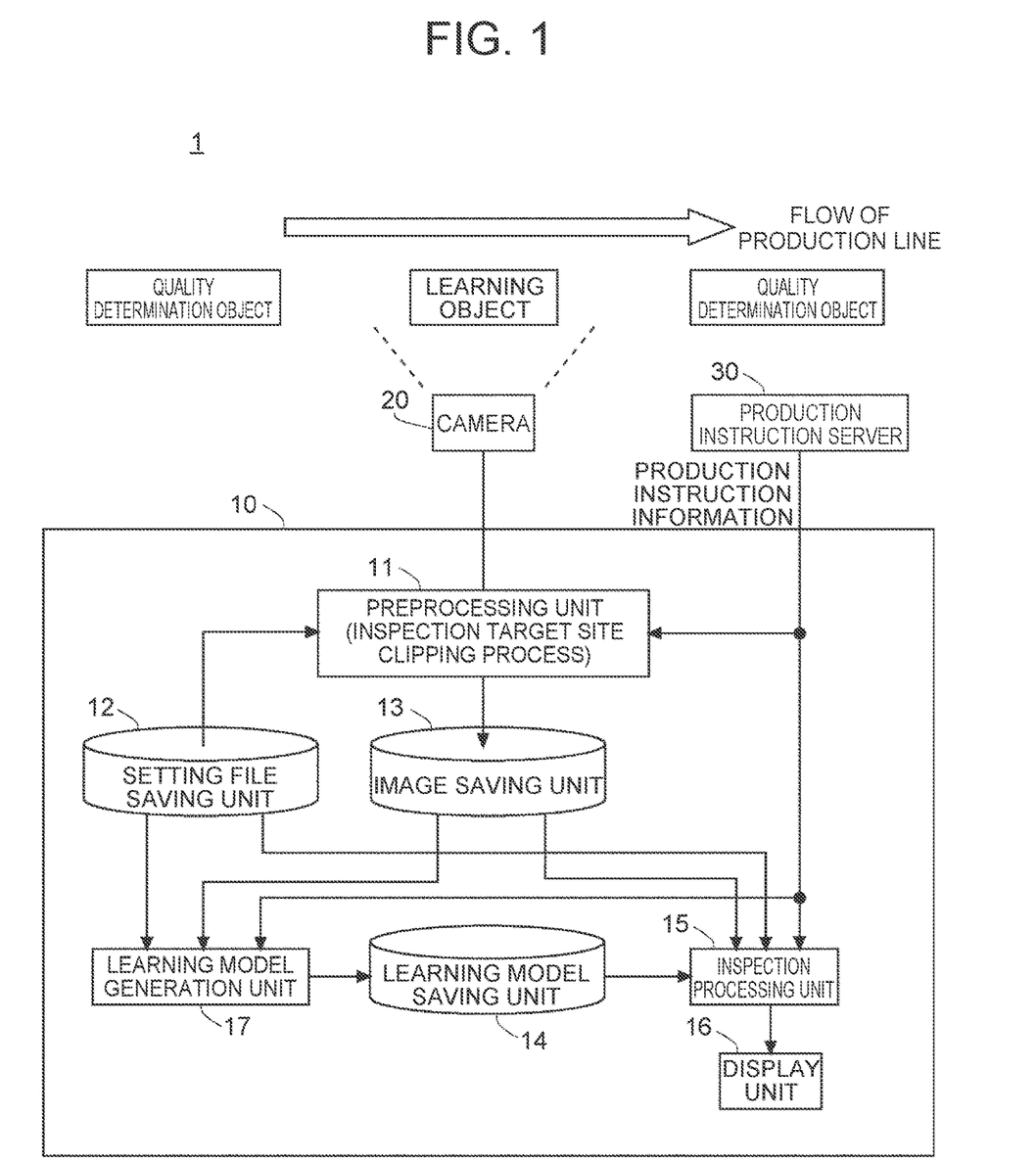
FIG. 1 is a schematic view of a machine learning system according to Embodiment 1.

First, FIG. 1 shows a schematic view of a machine learning system 1 according to Embodiment 1. As shown in FIG. 1, the machine learning system 1 according to Embodiment 1 includes an inspection device 10 that performs a quality determination for a product by artificial intelligence that uses a learning model. In the machine learning system 1, a quality determination object that is actually produced and a learning object for which a learning model to be used for inspection has not been created yet are conveyed on an identical production line, as products that are inspection targets. Then, the quality determination is performed for the quality determination object, while learning data that is used for the generation of the learning model is collected for the leaning object.

The machine learning system 1 according to Embodiment 1 will be explained in detail. As shown in FIG. 1, the machine learning system 1 according to Embodiment 1 includes an inspection device 10, an image pickup unit (for example, a camera 20), and a production instruction server 30. In FIG. 1, the inspection device 10, the camera 20 and the production instruction server 30 are described as independent constituents that are away from each other, but the devices may be implemented as a single device. In many cases, the production instruction server 30 is configured to exchange information with the inspection device 10 through a communication line. The camera 20 photographs the product that is conveyed on the production line, and acquires a product image. The product includes the quality determination object and the learning object.

The inspection device 10 includes a preprocessing unit 11, a setting file saving unit 12, an image saving unit 13, a learning model saving unit 14, an inspection processing unit 15, a display unit 16 and a learning model generation unit 17. Each of the setting file saving unit 12, the image saving unit 13 and the learning model saving unit 14 is a storage device such as a hard disk or a solid state drive (SSD) of a computer, for example. Further, each of the preprocessing unit 11, the inspection processing unit 15, the display unit 16 and the learning model generation unit 17 can be realized by a program that is executed by a computation unit of a computer. Further, the learning model generation unit 17 may be disposed in a cloud server, for example.

The preprocessing unit 11 generates an inspection target site image by clipping an image of an inspection target site of the product based on a setting file that indicates the position and range of the inspection target site on a product image, and saves the generated inspection target site image in the image saving unit 13. The setting file is previously created by an operator, and is saved in the setting file saving unit 12. More specifically, the preprocessing unit 11 reads production instruction information from the production instruction server 30, and reads, from the setting file saving unit 12, a setting file corresponding to product information that is described in the production instruction information.

The production instruction information and the setting file will be explained in detail. In the following explanation, as the product, a vehicle, or a constituent component of a vehicle is adopted as an inspection target product. Further, each of the production instruction information and the setting file is created by the operator in advance, and is saved in the production instruction server 30 and the setting file saving unit 12.

Figure 2:
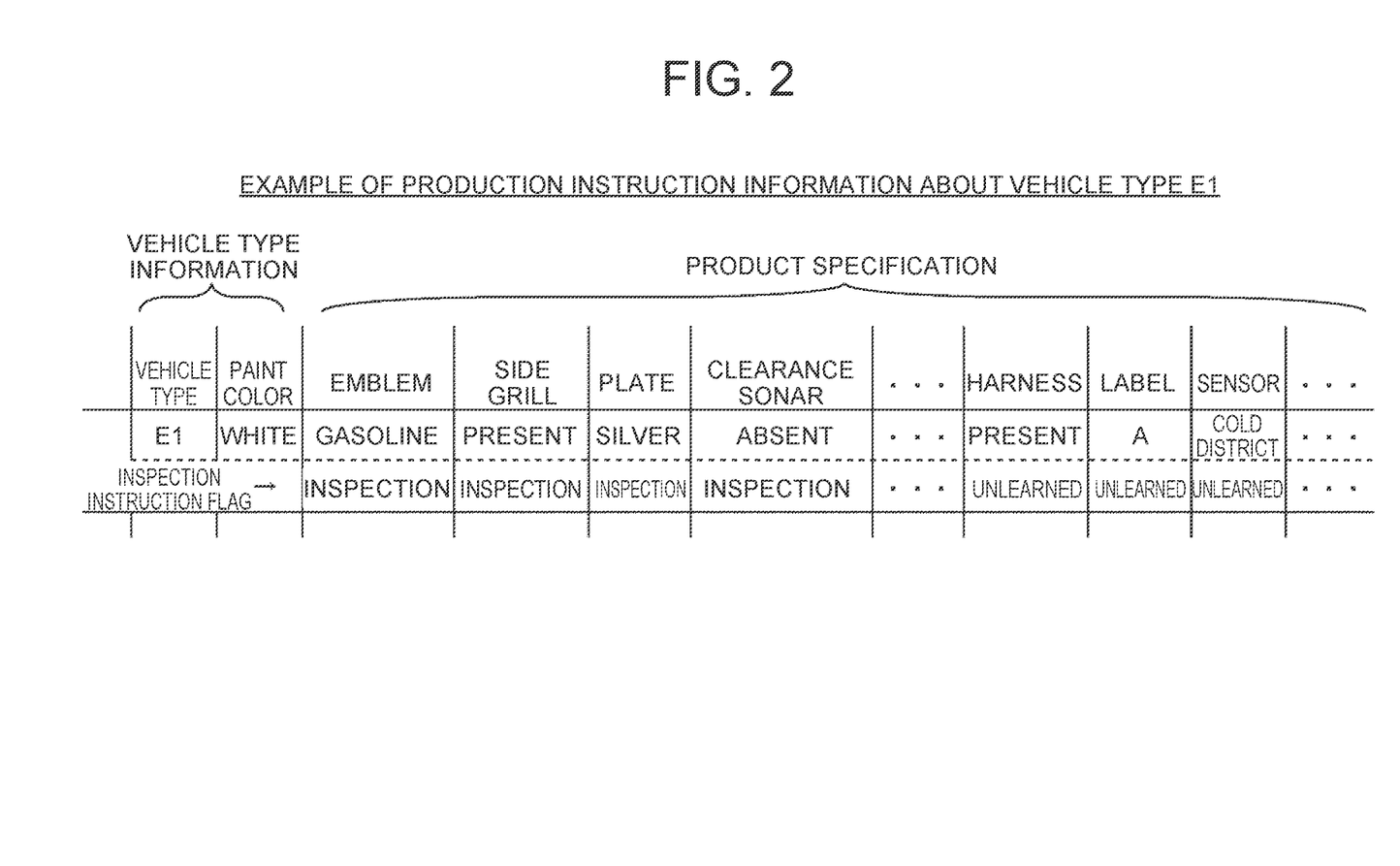
FIG. 2 is an example of production instruction information that is used in the machine learning system according to Embodiment 1.

First, FIG. 2 shows an example of the production instruction information that is used in the machine learning system according to Embodiment 1. The example shown in FIG. 2 is relevant to a vehicle type E1 in which the paint color is white. As shown in FIG. 2, the production instruction information is provided for each product (for example, for each vehicle type), and depending on the flow of the production line, the production instruction server 30 sends the production instruction information about a vehicle type that needs to be inspected, to the preprocessing unit 11 when appropriate. In the example shown in FIG. 2, in the production instruction information, the vehicle type and the paint color are included in vehicle type information, and the vehicle type information describes a product specification related to the vehicle type. As the product specification, information indicating whether a component to be attached to the product is present or absent, and the kind of the component are described. In the machine learning system 1 according to Embodiment 1, the inspection target site is a site that is described in the product specification, and the quality determination is performed for each inspection target site. Further, in the machine learning system 1 according to Embodiment 1, an inspection instruction flag is shown in the production instruction information. The inspection instruction flag indicates one of an inspection target status and an unlearned status for each inspection target site.

Figure 3:
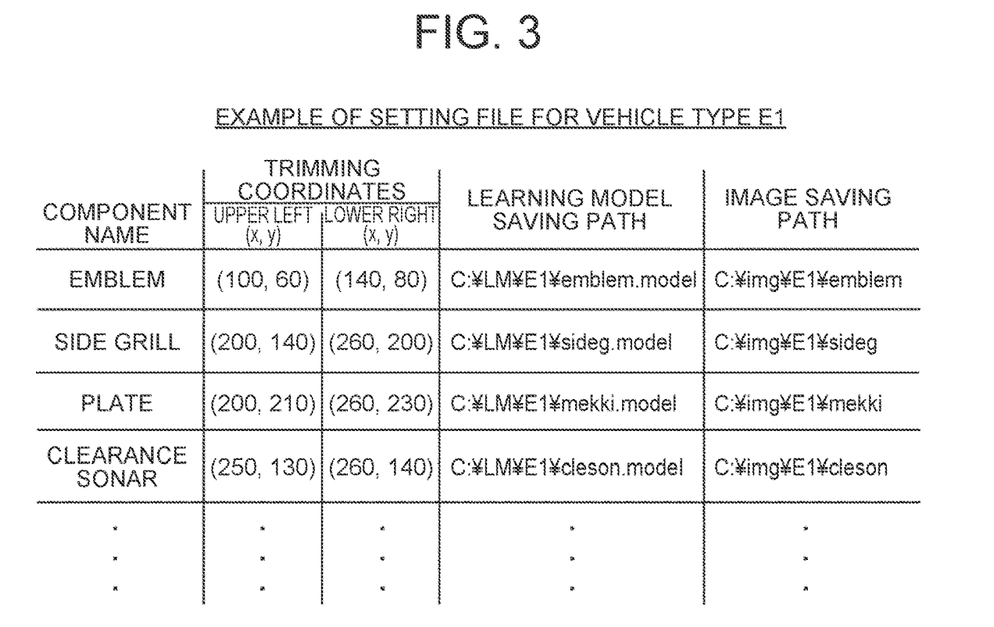
FIG. 3 is an example of a description content of a setting file that is used in the machine learning system according to Embodiment 1.

Subsequently, FIG. 3 shows an example of a description content of the setting file that is used in the machine learning system according to Embodiment 1. The example shown in FIG. 3 shows a part of the setting file corresponding to the vehicle type E1 shown in FIG. 2. As shown in FIG. 3, in the setting file, trimming coordinates for clipping a region containing the inspection target site from the product image acquired by the preprocessing unit 11, a learning model path indicating a place where the learning model is saved, and an image saving path where the inspection target site image generated by the clipping process in the preprocessing unit 11 is saved are described for each inspection target site.

Figure 4:
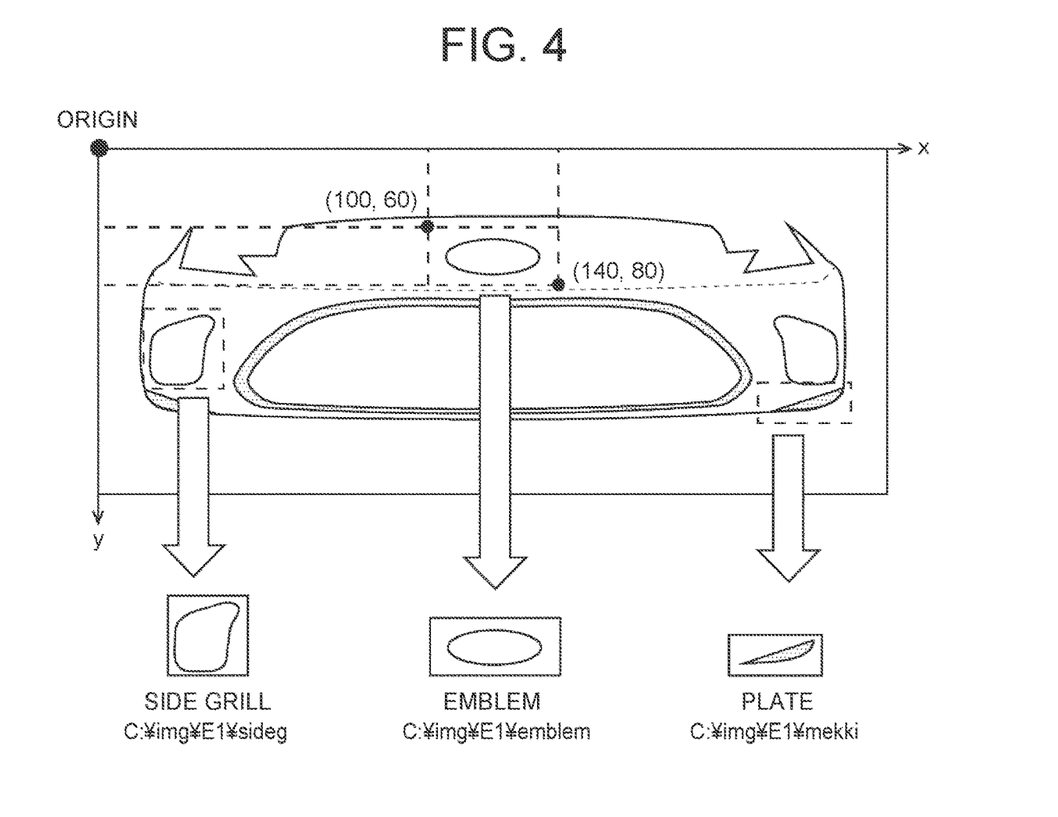
FIG. 4 is a diagram for explaining a preprocess in the machine learning system according to Embodiment 1.

A preprocess in the preprocessing unit 11 will be explained with reference to FIG. 4. FIG. 4 shows a diagram for explaining the preprocess in the machine learning system according to Embodiment 1. In an example shown in FIG. 4, the preprocessing unit 11 performs the clipping process on the product image acquired by the camera 20, based on the setting file. As shown in FIG. 4, the preprocessing unit 11 generates a clipped image of a portion containing the inspection target site such as the emblem, as the inspection target site image, based on trimming coordinates described in the setting file. Then, the preprocessing unit 11 saves the generated inspection target site image in the image saving path described in the setting file.

For example, in the case of the emblem, the preprocessing unit 11 generates the inspection target site image of the emblem, by clipping the range of a region containing the emblem, based on trimming coordinates indicated in the setting file in FIG. 3. The inspection processing unit 15 performs the quality determination process to which the artificial intelligence is applied, to the inspection target site image of the quality determination object that is indicated as the quality determination target by the production instruction information in which the specification of the product is described. More specifically, the inspection processing unit 15 selects the learning model for each inspection target site saved in the image saving unit 13, and determines whether the inspection target site matches the specification indicated by the production instruction information, with the artificial intelligence for which the selected learning model is used. The display unit 16 displays an inspection result by the inspection processing unit 15, to the operator, and displays a user interface through which the operator operates the inspection device 10.

When the inspection target site image is generated by the preprocessing unit 11, the inspection processing unit 15 performs the inspection to each inspection target site image, but skips the inspection for the learning object. Thereby, an originally conforming product is prevented from being determined as a reject product due to an erroneous inconsistence result between the production instruction information and the inspection result.

The learning model generation unit 17 reads the inspection target site image indicated as the leaning target in the production instruction information, from the image saving unit 13, and generates a learning model that receives the read inspection target site image and that can discriminate the inspection target site image of the learning target by the machine learning in which the production instruction information is adopted as teaching data. Thereby, the artificial intelligence to which the learning model generated by the learning model generation unit 17 is applied can output the specification of the site indicated by the production instruction information, when the inspection target site image of the learning target is input. Further, the learning model generation unit 17 saves the generated learning model in a learning model saving path (for example, in a storage region within the learning model saving unit 14) described in the setting file.

Figure 5:
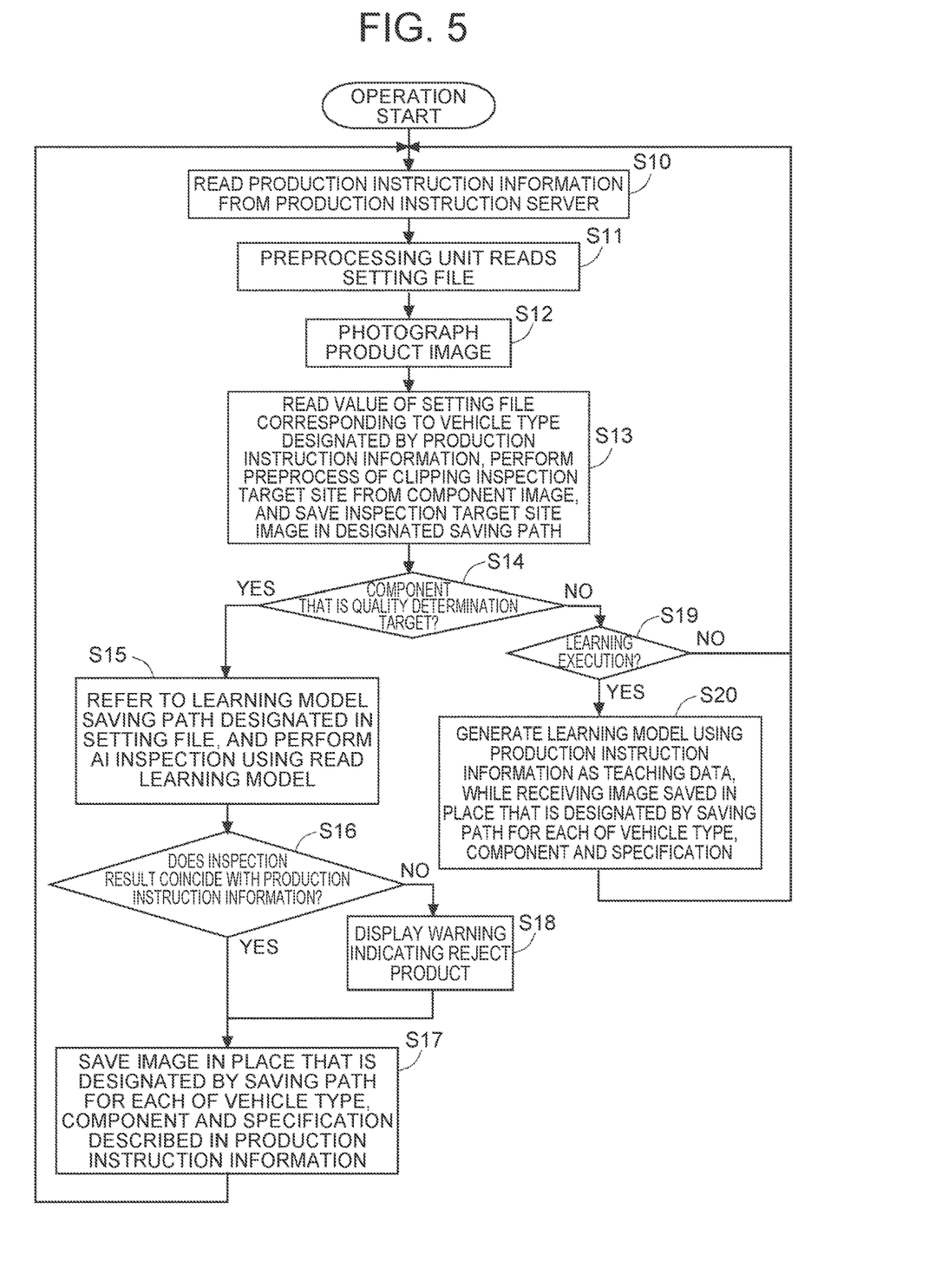
FIG. 5 is a flowchart for explaining a behavior of the machine learning system according to Embodiment 1.

Subsequently, a behavior of the machine learning system 1 according to Embodiment 1 will be explained. FIG. 5 is a flowchart for explaining the behavior of the machine learning system 1 according to Embodiment 1. FIG. 5 shows the behavior of the machine learning system 1 when the quality determination object that is actually produced and the learning object for which the learning model to be used for inspection has not been created yet are conveyed on an identical line, as products that are inspection targets. In the behavior of the machine learning system 1 shown in FIG. 5, the quality determination is performed for the quality determination object, while the learning data that is used for the generation of the learning model is collected for the learning object and the learning in which the collected learning data is used is performed. The learning process in which the learning data is used may be performed by a different device from the inspection device 10 of the machine learning system 1.

As shown in FIG. 5, in the machine learning system 1 according to Embodiment 1, first, the inspection device 10 reads the production instruction information sent from the production instruction server 30 (step S10). In the machine learning system 1, each of the preprocessing unit 11, the inspection processing unit 15 and the learning model generation unit 17 reads the production instruction information.

Next, the preprocessing unit 11 reads the setting file saved in the setting file saving unit 12 (step S11). Thereafter, the preprocessing unit 11 photographs the product image using the camera 20 (step S12), reads the setting file that corresponds to the vehicle type described in the production instruction information read in step S10, and generates the inspection target site image by clipping the inspection target site from the photographed product image. Further, the preprocessing unit 11 saves the generated inspection target site image in the image saving unit 13 (step S13).

The processes of steps S10 to S13 are performed in common in the inspection process and learning data collection process in which the inspection device 10 is used. That is, in the machine learning system 1, the preprocessing unit 11 is used in common for the inspection and the collection of the learning data.

Subsequently, in the machine learning system 1 according to Embodiment 1, the inspection processing unit 15 reads the inspection target site image saved in the image saving unit 13, and executes the inspection. At this time, the inspection processing unit 15 refers to the production instruction information read in step S10, and refers to the inspection instruction flag for the read inspection target site image. When the inspection instruction flag indicates the inspection target status, the inspection processing unit 15 performs the inspection process, and when the inspection instruction flag indicates the unlearned status, the inspection processing unit 15 reads the next inspection target site image without executing the inspection process. That is, the inspection processing unit 15 determines whether the read inspection target site image is an image of a component that is the quality determination target. Then, the inspection processing unit 15 executes the inspection process if the determination is true, and does not execute the inspection if the determination is false (step S14).

In the inspection process after the determination of YES is made in step S14, the inspection processing unit 15 refers to the learning model saving path designated in the setting file, and performs the AI inspection to the inspection target site image, using the read learning model (step S15). The inspection processing unit 15 outputs the inspection result after the inspection processing unit 15 performs the inspection process to all inspection target site images included in a single product image. In the case where the inspection result coincides with the production instruction information, the inspection processing unit 15 determines that the inspected product is a conforming product (YES in step S16), and saves the image in a place that is designated by the saving path in the setting file for each of the vehicle type, component and specification described in the production instruction information (step S17). The image that is saved in step S17 is saved as a production log. In the case where the inspection result does not coincide with the production instruction information in step S16 (NO in step S16), the inspection processing unit 15 outputs a warning indicating the appearance of the reject product, on the display unit 16 (step S18), and then saves the image for the production log (step S17).

On the other hand, in the process after the determination of NO is made in step S14, the learning process is performed. In the learning process, the learning model generation unit 17 determines whether the current timing is a learning execution timing (step S19). In the machine learning system 1 according to Embodiment 1, the learning model generation unit 17 executes the generation of the learning model and the relearning of the learning model, with a previously set period (for example, a period of six months to one year) or at a timing designated by the operator or the system. In the case where the learning model generation unit 17 determines that the current timing is a predetermined learning timing (YES in step S19), the learning model generation unit 17 generates the learning model using the production instruction information as teaching data, while receiving the inspection target site image saved at the place that is designated by the saving path in the setting file (step S20). The learning model generation unit 17 generates the learning model for each combination of the vehicle type and the inspection target site.

In the case where the learning model generation unit 17 determines in step S19 that the current timing is not the learning execution timing (NO in step S19), or after the process of step S20, the process is performed from step S10 again, for the next inspection product.

As described above, in the machine learning system 1 according to Embodiment 1, the learning data that is used for the generation of the learning model is collected using the preprocessing unit 11 of the inspection device 10 that uses for the inspection of the product. Thereby, it is not necessary to separately prepare a system for generating the learning data, and it is possible to simplify the system configuration.

Further, in the machine learning system 1 according to Embodiment 1, the component as the learning target is conveyed together with the product as the inspection target, on the production line on which the product as the inspection target is conveyed, and thereby, the learning data can be collected. Therefore, it is not necessary to separately provide a line for collecting the learning data, and therefore, it is possible to simplify the system configuration. Further, in the machine learning system 1 according to Embodiment 1, the learning data is collected by conveying the product as the learning target on the production line for the actual production. Therefore, it is possible to equalize the image acquisition condition between the actual inspection and the learning state, it is possible to generate a learning model having a high component detection accuracy.

Further, in the machine learning system 1 according to Embodiment 1, it is possible to clip the inspection target site image from the product image by computer processing, using the preprocessing unit 11. Therefore, it is not necessary for the operator to manually generate the inspection target site image for the learning data, allowing an efficient collection of the learning data.

Further, in the machine learning system 1 according to Embodiment 1, it is possible to execute the inspection of the inspection target site using only an optical camera as the image pickup unit. Therefore, it is not necessary to provide a plurality of kinds of sensors, and it is possible to prevent the complication of the system configuration.

The disclosure made by the inventor has been specifically explained above based on the embodiment. The present disclosure is not limited to the above-described embodiment. Needless to say, various modifications can be made without departing from the spirit of the present disclosure.

What is claimed is:

1. A machine learning system comprising:
    a camera configured to acquire a product image by imaging a product;
    a first memory; and
    a processor configured to generate an inspection target site image by clipping, from the product image, images of a plurality of inspection target sites, including an image of an inspection target site of the plurality of inspection target sites, of the product based on a setting file that indicates positions and ranges of the plurality of inspection target sites on the product image, and to save the images of the plurality of inspection target sites in the first memory, the positions and ranges including a position and range of the inspection target site on the product image;
    wherein the processor is further configured to:
        determine, based on production instruction information in which a specification of the product is described, whether the inspection target site has been learned by any of one or more pre-trained models as any of a plurality of quality determination objects;

perform, based on determining that the inspection target site has been learned by a first model of the one or more pre-trained models as a quality determination object of the plurality of quality determination objects, a quality determination process on the inspection target site image as the quality determination object, the quality determination process being a process to which artificial intelligence is applied by the first model;

determine, based on the production instruction information, whether a second inspection target site, of the plurality of inspection target sites, has been learned by any of the one or more pre-trained models as any of the plurality of quality determination objects; and generate, based on determining that the second inspection target site has not been learned by any of the one or more pre-trained models, a learning model that is used for quality determination for the second inspection target site as a learning object, the learning model being a model to which learning data, comprising a second image, is input and in which the production instruction information relevant to the learning object is used as teaching data, the second image being of the second inspection target site from the images of the plurality of inspection target sites clipped from the product image acquired by the camera, wherein the processor is further configured to determine whether to accumulate, in the first memory, the second image of the second inspection target site as learning data of the learning model based on the production instruction information indicating the second inspection target site as a learning object that is not a quality determination target, among the images of the plurality of inspection target sites in the first memory, wherein the production instruction information includes a plurality of inspection instruction flags, each of the plurality of inspection instruction flags corresponding to a respective inspection target site of the plurality of inspection target sites and indicating the respective inspection target site as one of an inspection target status and an unlearned status, the inspection target status indicating that at least one of the one or more pre-trained models have been pre-trained for inspection of the respective inspection target site, and the unlearned status indicating that none of the one or more pre-trained models have been pre-trained for inspection of the respective inspection target site, and wherein the processor is further configured to:
read the inspection target site image based on the inspection target site image being saved in the first memory;
determine the first model as corresponding to the inspection target site image;
perform the quality determination process based on determining the first model as corresponding to the inspection target site image; and
skip the quality determination process for the second inspection target site based on determining that an inspection instruction flag, of the plurality of inspection instruction flags, corresponding to the second inspection target site indicates the unlearned status in the production instruction information.

2. The machine learning system according to claim 1, wherein the processor saves the inspection target site image in the first memory, in association with the production instruction information.

3. The machine learning system according to claim 1, further comprising:
a second memory,
wherein the processor reads the setting file corresponding to the product based on the production instruction information, from the second memory, and saves the inspection target site image in a file path described in the setting file.

4. The machine learning system according to claim 1, wherein the product is a vehicle or a part of the vehicle.

5. The machine learning system according to claim 1, wherein the machine learning system is set so as to perform the quality determination process on the product on a production line.

6. The machine learning system according to claim 1,
wherein the inspection target site indicates any of a vehicle type of the product, a paint color of the product, an emblem of the product, a side grill of the product, a plate of the product, and a clearance sonar of the product,
wherein the second inspection target site indicates any of a harness of the product, a label of the product, and a sensor of the product,
wherein ones of the plurality of inspection instruction flags respectively correspond to ones of the vehicle type of the product, the paint color of the product, the emblem of the product, the side grill of the product, the plate of the product, the clearance sonar of the product, the harness of the product, the label of the product, and the sensor of the product.

7. A method for collecting learning data using an inspection device that performs a quality determination process of a product on a production line, the learning data being used for creation of a learning model that is applied to artificial intelligence, the method comprising:
an image pickup process of imaging, by a camera, the product as the product is conveyed on the production line, and acquiring a product image based on imaging the product;
a preprocess of generating an inspection target site image by clipping, from the product image, images of a plurality of inspection target sites, including an image of an inspection target site of the plurality of inspection target sites, of the product based on a setting file that indicates positions and ranges of the plurality of inspection target sites on the product image, and saving the images of the plurality of inspection target sites in a memory, the positions and ranges including a position and range of the inspection target site on the product image;
determining, based on production instruction information in which a specification of the product is described, whether the inspection target site has been learned by any of one or more pre-trained models as any of a plurality of quality determination objects;
performing, based on determining that the inspection target site has been learned by a first model of the one or more pre-trained models as a quality determination object of the plurality of quality determination objects, the quality determination process on the inspection target site image as the quality determination object, the quality determination process being a process to which artificial intelligence is applied by the first model;

determining, based on the production instruction information, whether a second inspection target site, of the plurality of inspection target sites, has been learned by any of the one or more pre-trained models as any of the plurality of quality determination objects;

generating, based on determining that the second inspection target site has not been learned by any of the one or more pre-trained models, a first learning model that is used for quality determination for the second inspection target site as a learning object, the first learning model being a model to which learning data, comprising a second image, is input and in which the production instruction information relevant to the learning object is used as teaching data, the second image being of the second inspection target site from the images of the plurality of inspection target sites clipped from the product image acquired by the camera; and determining whether to accumulate, in the memory, the second image of the second inspection target site as learning data of the first learning model based on the production instruction information indicating the second inspection target site as a learning object that is not a quality determination target, among the images of the plurality of inspection target sites in the memory, wherein the production instruction information includes a plurality of inspection instruction flags, each of the plurality of inspection instruction flags corresponding to a respective inspection target site of the plurality of inspection target sites and indicating the respective inspection target site as one of an inspection target status and an unlearned status, the inspection target status indicating that at least one of the one or more pre-trained models have been pre-trained for inspection of the respective inspection target site, and the unlearned status indicating that none of the one or more pre-trained models have been pre-trained for inspection of the respective inspection target site, and wherein the method further comprises:
reading the inspection target site image based on the inspection target site image being saved in the memory;
determining the first model as corresponding to the inspection target site image;
performing the quality determination process based on determining the first model as corresponding to the inspection target site image; and
skipping the quality determination process for the second inspection target site based on determining that an inspection instruction flag, of the plurality of inspection instruction flags, corresponding to the second inspection target site indicates the unlearned status in the production instruction information.

8. A non-transitory storage medium storing a learning data collection program that collects learning data using an inspection device that performs a quality determination process of a product on a production line, the learning data collection program being executed by a computation unit provided in the inspection device, the learning data being used for creation of a learning model that is applied to artificial intelligence, the learning data collection program comprising:

an image pickup process of imaging, by a camera, the product as the product is conveyed on the production line, and acquiring a product image based on imaging the product;

a preprocess of generating an inspection target site image by clipping, from the product image, images of a plurality of inspection target sites, including an image of an inspection target site of the plurality of inspection target sites, of the product based on a setting file that indicates positions and ranges of the plurality of inspection target sites on the product image, and saving the images of the plurality of inspection target sites in a memory, the positions and ranges including a position and range of the inspection target site on the product image;

determining, based on production instruction information in which a specification of the product is described, whether the inspection target site has been learned by any of one or more pre-trained models as any of a plurality of quality determination objects;

performing, based on determining that the inspection target site has been learned by a first model of the one or more pre-trained models as a quality determination object of the plurality of quality determination objects, the quality determination process on the inspection target site image as the quality determination object, the quality determination process being a process to which artificial intelligence is applied by the first model;

determining, based on the production instruction information, whether a second inspection target site, of the plurality of inspection target sites, has been learned by any of the one or more pre-trained models as any of the plurality of quality determination objects;

generating, based on determining that the second inspection target site has not been learned by any of the one or more pre-trained models, a first learning model that is used for quality determination for the second inspection target site as a learning object, the first learning model being a model to which learning data, comprising a second image, is input and in which the production instruction information relevant to the learning object is used as teaching data, the second image being of the second inspection target site from the images of the plurality of inspection target sites clipped from the product image acquired by the camera; and determining whether to accumulate, in the memory, the second image of the second inspection target site as learning data of the first learning model based on the production instruction information indicating the second inspection target site as a learning object that is not a quality determination target, among the images of the plurality of inspection target sites in the memory, wherein the production instruction information includes a plurality of inspection instruction flags, each of the plurality of inspection instruction flags corresponding to a respective inspection target site of the plurality of inspection target sites and indicating the respective inspection target site as one of an inspection target status and an unlearned status, the inspection target status indicating that at least one of the one or more pre-trained models have been pre-trained for inspection of the respective inspection target site, and the unlearned status indicating that none of the one or more pre-trained models have been pre-trained for inspection of the respective inspection target site, and wherein the learning data collection program further comprises:
reading the inspection target site image based on the inspection target site image being saved in the memory;
determining the first model as corresponding to the inspection target site image;

performing the quality determination process based on determining the first model as corresponding to the inspection target site image; and skipping the quality determination process for the second inspection target site based on determining that an inspection instruction flag, of the plurality of inspection instruction flags, corresponding to the second inspection target site indicates the unlearned status in the production instruction information.

\* \* \* \* \*